W. WRIGHT.
COMBINED TYPE WRITING AND COMPUTING MACHINE.
APPLICATION FILED SEPT. 13, 1911. RENEWED AUG. 4, 1917.
1,244,572.
Patented Oct. 30, 1917.
5 SHEETS—SHEET 1.
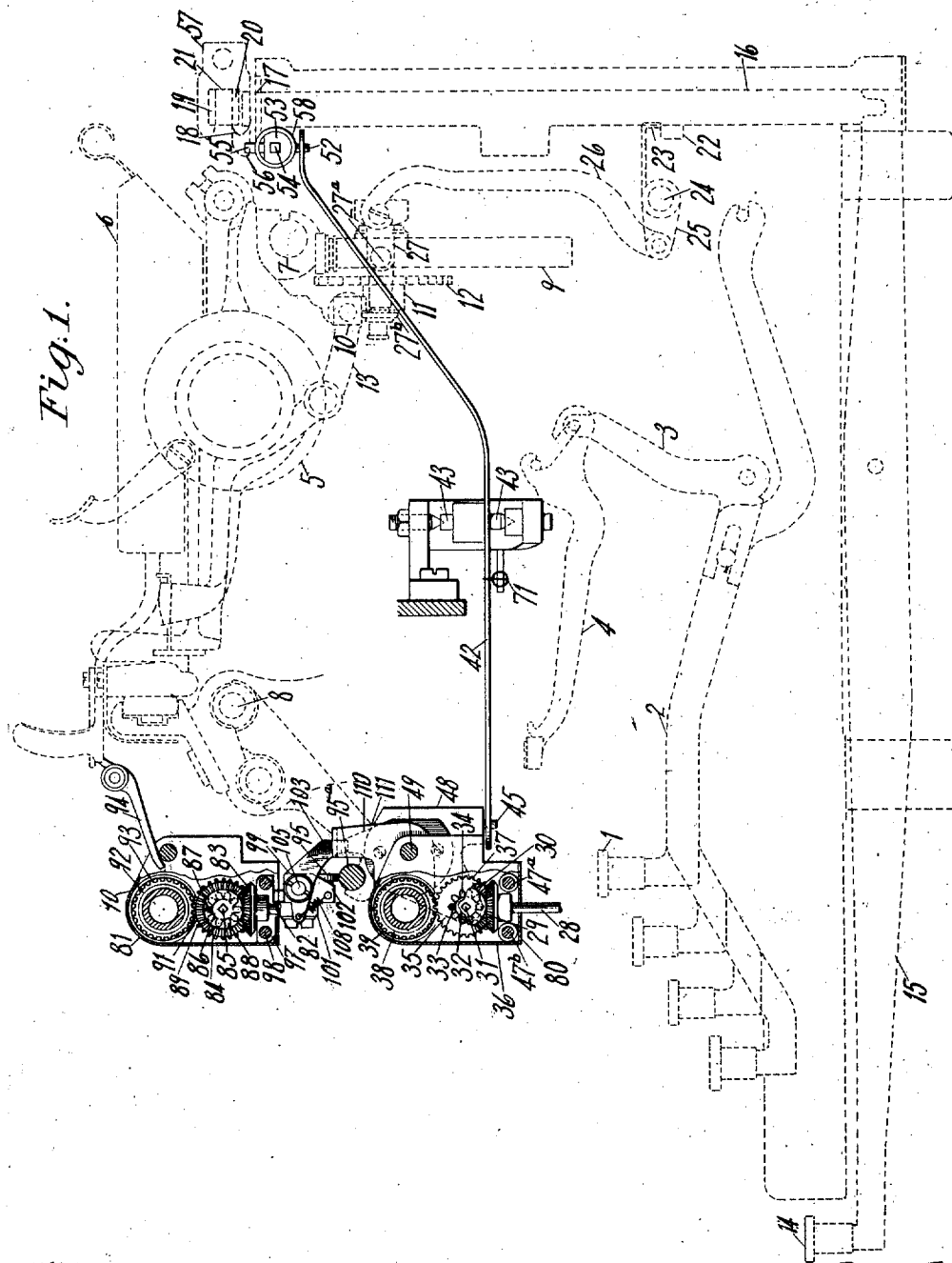
Witnesses:
Julius Duchstine
H. Whiting
Inventor:
Walter Wright
By B.C. Stickney
Attorney

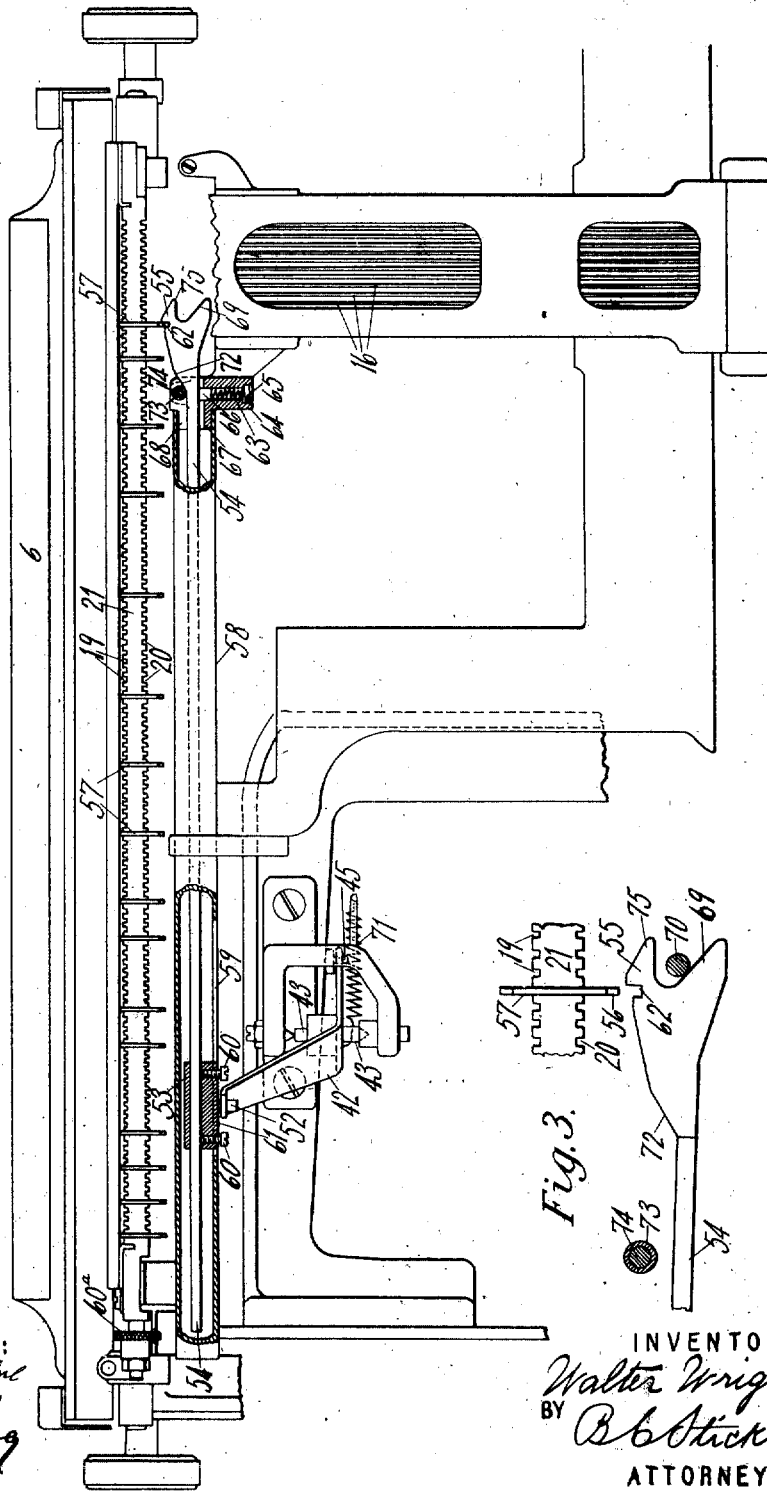

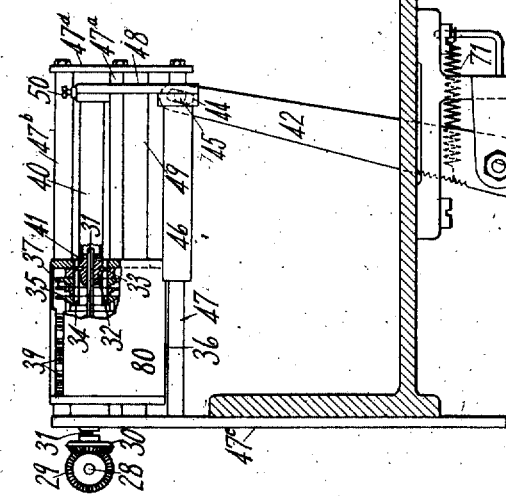

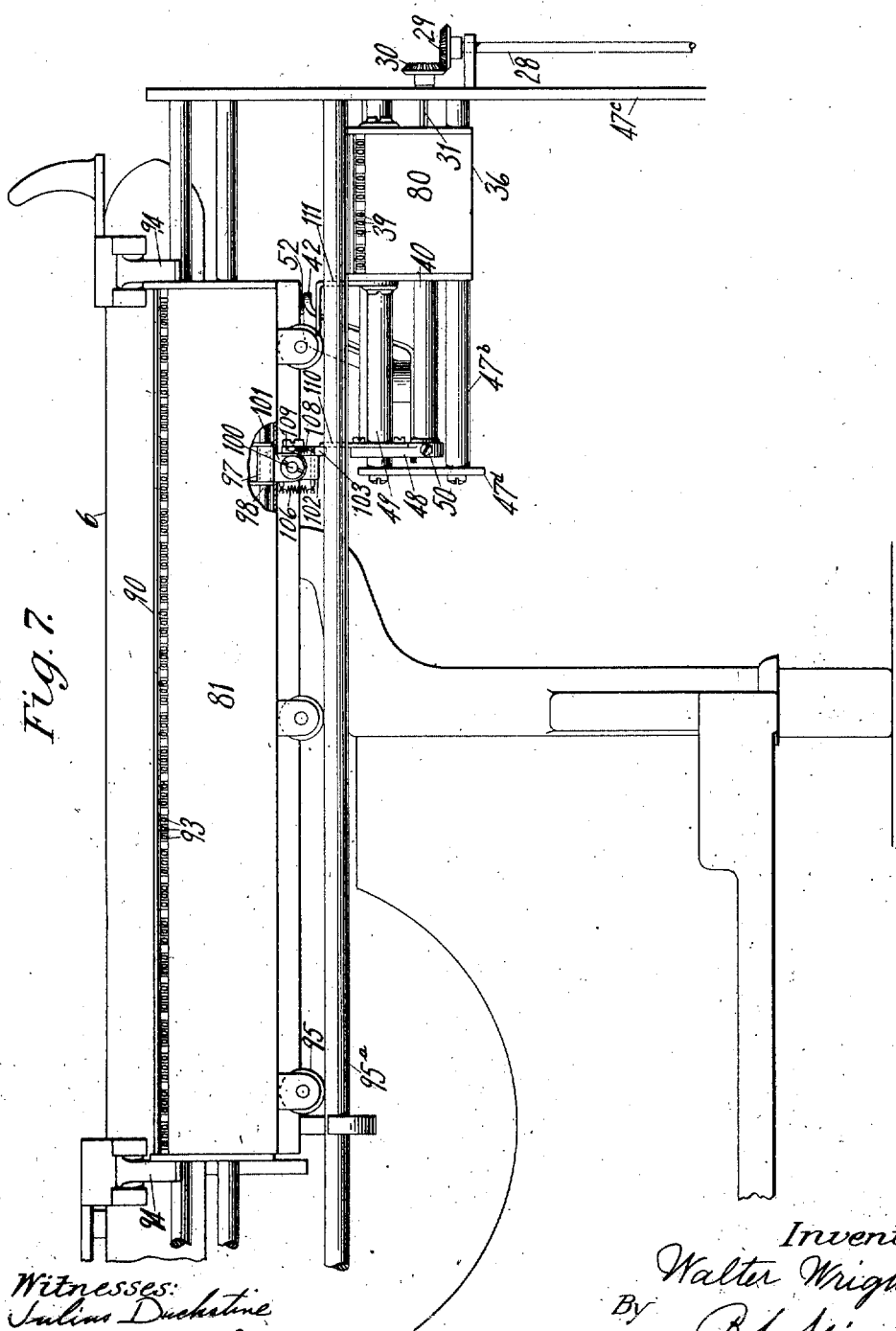

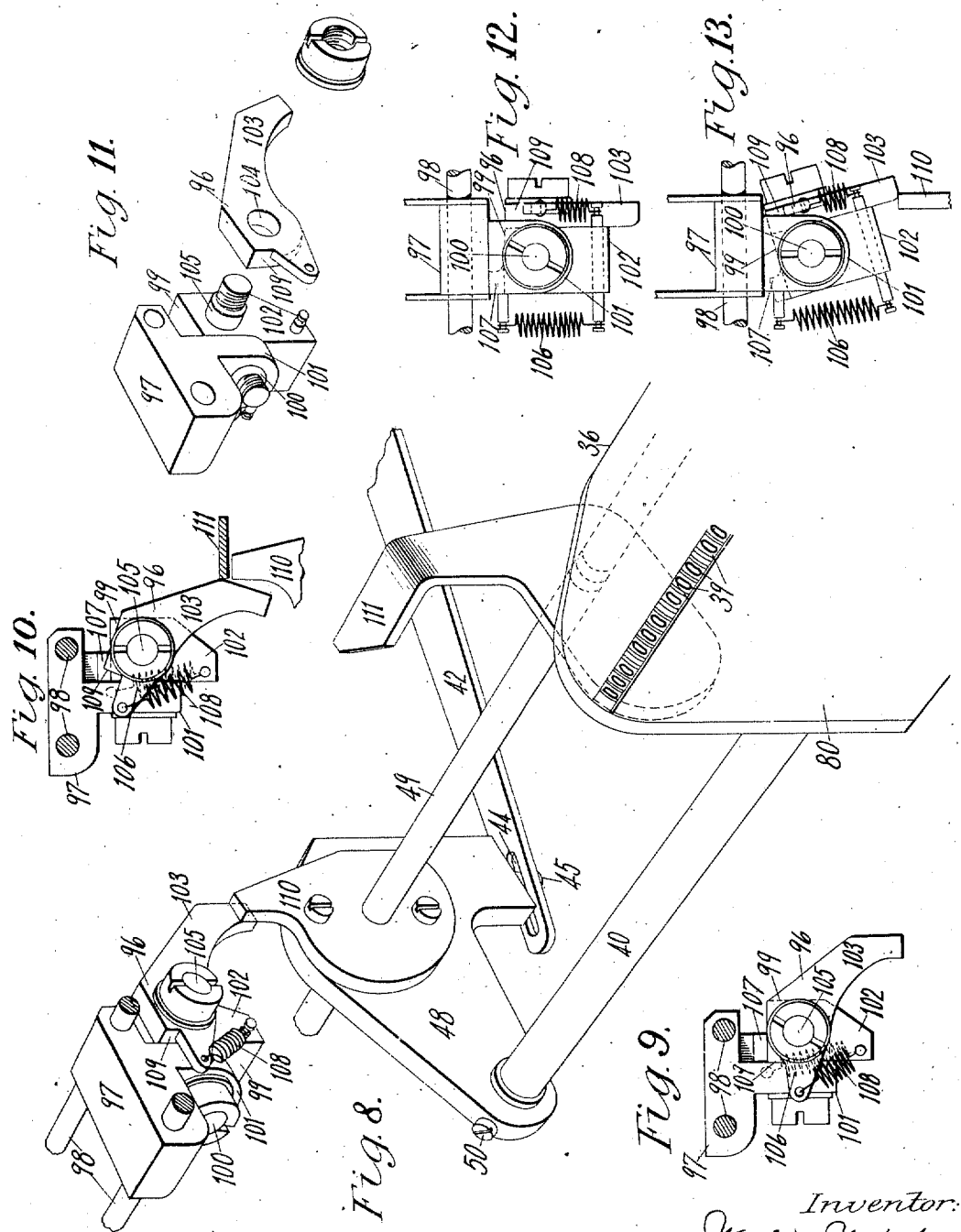

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,244,572.     Specification of Letters Patent.     Patented Oct. 30, 1917.

Application filed September 13, 1911, Serial No. 649,163. Renewed August 4, 1917. Serial No. 184,544.

*To all whom it may concern:*

Be it known that I, WALTER WRIGHT, a citizen of the United States, residing in New York city, in the county of New York and State of New York, have invented certain new and useful Improvements in Combined Type-Writing and Computing Machines, of which the following is a specification.

This invention relates to a new and improved computing head support, and is an improvement on my pending application No. 574,813, filed August 1, 1910.

In said application is disclosed a totalizer comprising a master wheel which is intermittently connected to travel step by step with the typewriter carriage, being released at intervals and again caught up by the carriage during one traverse of said carriage, thus permitting said totalizer to be used for cross adding.

In said application the master wheel forms part of a computing carriage, which is attached to one end of a lever pivoted intermediate its ends in such a way that the opposite end of said lever, by means of a hook attached thereto, will be caught by tabulating stops settable on the typewriter carriage and carried along thereby until the end of a computing column is reached. After the end of such a column is reached, said hook is freed from the tabulating stop which has been carrying it along, and a spring automatically draws said master wheel to the left-hand end of the totalizer ready to begin computing in a new column.

Sometimes it is desirable to use such a cross totalizer in combination with a footing totalizer extending the whole length of a writing line, which footing totalizer may be utilized as though it were a group of small, separate, footing totalizers.

Such a combination of cross and footing totalizers is shown in my co-pending application 485,046, filed March 22, 1909; and if the number of computing wheels in each group used as a small footing totalizer is at least as great as the number of computing wheels in the cross totalizer, the mechanism set forth in my said application 574,813, filed August 1, 1910, will cross-add the items in said footing totalizer correctly.

If, however, the group of computing wheels used as a footing totalizer at the extreme left-hand of the footing totalizer is smaller than the number of wheels in the cross totalizer, the master wheel of the cross totalizer would at times engage with the highest computing wheel in said cross totalizer, while the footing master wheel was engaged with the highest wheel of a small footing totalizer having a less number of wheels, with the result that one totalizer, for example, might register "1" in its hundreds wheel, whereas the cross totalizer might register "1" in its trillions wheel. It is obvious that such a condition of affairs would produce a complexity of errors in cross adding, which could not be disentangled. The present invention provides means whereby such errors are automatically prevented. If it is desired, for example, to utilize the three letter-spaces or computing wheels at the extreme left-hand of the footing totalizer as a small footing totalizer of which the items are cross-added into the cross totalizer, a stop is placed in the third space on the tabulating rack bar, and when the typewriter carriage is returned for the beginning of a new line, a device automatically may swing the cross-adding master wheel to bring the hook controlling it at a point where it will catch said stop.

To bring about this result, the typewriter carriage may be provided with a latch which is normally ineffective on the computing carriage of the cross totalizer. When, however, the typewriter carriage is returned to begin a new line of writing, said latch may catch the cross-adding carriage and carry it back so that the cross-adding master wheel engages momentarily the lowest computing wheel of its totalizer. At that moment, the cross computing carriage may be released, thus permitting said computing carriage automatically to bring said master wheel toward the highest or left-hand computing wheel.

Where this latch is used for the cross-adding master wheel in a machine of the type shown in my aforesaid application 574,813, the release of the latch permits the master wheel to automatically return to engage the left-hand cross computing wheel. This return movement is arrested if a column stop is placed to catch the master wheel at a point intermediate its travel. If said stop has been placed in the third letter-space and the three left-hand wheels of the footing totalizer are utilized as a small footing totalizer, any digit registered in the highest or hundreds computing wheel of said small totalizer will be registered in the hundreds computing wheel of the cross totalizer. After having done cross addition and footing in this column, the master wheel is released as usual and caught by the next stop.

In other words, it may be said that there is provided a connection between the carriage and the totalizer or cross computer, which manipulates the totalizer so as to govern step-by-step the relative position of the master wheel and the computing wheels, so as to add in the proper column, which connection acts to reset the cross computer or totalizer at the end of each number or column of numbers, and before the next number or column of numbers, so as to start with the highest denomination of the next number; the action being controlled by tabular stops, as described in my said pending application 574,813.

On the return of the carriage at the end of a line, the continuity of the action of this connection is interrupted, that is to say, it resets the movable portion of the cross computing mechanism or totalizer, the full distance instead of a partial distance, so that the carriage loses accurate control of the totalizer or cross-computing mechanism, and it is necessary to space up to the desired point before striking a numeral.

The means provided in this case to utilize the full length of the typewriting line without a space at the beginning, causes or enables the connection between the carriage and the totalizer to recover its accurate control of the relative position of the master wheel and the computing wheels. This is done by utilizing the return movement of the carriage to manipulate certain portions of the cross computing mechanism or totalizer a full ineffective or passive stroke, so as to enable a properly placed tabular stop to catch the connection on the automatic reset thereof, after the ineffective stroke, at a point corresponding to the denomination column in which it is desired to compute. In this case there is shown a connection between the carriage and the cross computing mechanism or totalizer, which is inoperative to connect the totalizer to the carriage on the letter-feeding movement of the carriage, but operative on the return movement of the carriage to operatively connect the two, so that certain portions of the cross computing mechanism or totalizer can be operated by the carriage. This connection may be automatic to the further extent that it will automatically be disconnected after it has accomplished the passive or ineffective stroke, so that the resetting mechanism may act.

In the embodiment used to illustrate this invention, the main computing mechanism or footing or sub-totalizer, which is carried with the carriage, is shown to carry a portion of the intermittent connection between the carriage and the cross computing mechanism or totalizer, so that it may be said that one computing mechanism is manipulated from the other computing mechanism.

Other objects and advantages will hereinafter appear.

In the accompanying drawings,

Figure 1 is a sectional elevation from front to rear, showing the present improvements applied to an Underwood front strike combined typewriting and computing machine.

Fig. 2 is a rear elevation of the machine.

Fig. 3 illustrates the manner of disconnecting the traveling member of the computing mechanism from the typewriter carriage.

Fig. 4 is a sectional plan of a portion of the lower computing mechanism or totalizer, showing the means for manipulating from the carriage, a portion of the computing mechanism step-by-step which also resets the computing mechanism.

Fig. 5 is a perspective view of one of the hooks and its connections.

Fig. 6 is a sectional view, showing the hook in cross-section, and also the spring by which it is lifted to connect it with the typewriter.

Fig. 7 is a fragmentary front view in elevation, showing a connection between the carriage and the upper computing mechanism or column adder, and the computing mechanism or totalizer.

Fig. 8 is a fragmentary perspective view, showing the engagement of the tripper with the ward on the cross computing mechanism, during the return motion of the carriage.

Fig. 9 is a detached detail view of the connector, showing the trip in its engaging position.

Fig. 10 is a view similar to Fig. 9, showing in addition the trip removed from engagement with the ward on the totalizer, by the tripper at the end of the stroke of the movable portion of the totalizer by the return movement of the carriage.

Fig. 11 is a perspective view, showing portions of the connector detached from each other, so as to bring out their true form.

Fig. 12 is a fragmentary front view in elevation of the connector, showing it in its position ready to engage with the ward on the cross computing mechanism or totalizer.

Fig. 13 is a view similar to Fig. 12, showing the trip as snapping over the ward on the totalizer during the step-by-step letter feeding movement of the carriage.

In the Underwood machine, numeral keys 1 depress levers 2 to vibrate bell cranks 3, and swing type bars 4 up to strike rearwardly against the front side of a platen 5. Said platen is mounted on a carriage 6, running on tracks 7, 8, and is driven by a spring barrel 9, and also has a rack 10 meshing with a pinion 11 connected to an escapement wheel 12, the escapement dogs, which are operated at every key stroke, being omitted. The rack 10 is hung on arms 13, so that it may be lifted from the pinion 11 to release the carriage.

Tabulator keys 14 are mounted upon levers 15, which, at their rear ends, raise the stop rods 16, having decimal stops 17 at their upper ends. These stops may coöperate with interchangeably adjustable column stops 18, of the ordinary type—said column stops being inserted, as required, in notches 19, 20, formed in the top and bottom of a bar 21, which is fixed to the carriage 6.

Each decimal stop-rod has a shoulder 22 coöperating with a universal bar 23, which rocks about a pivot 24, and has an arm 25, which draws down a link 26 and vibrates a lever 27, the latter fulcrumed at 27ᵃ and carrying a roll 27ᵇ to run upon the under side of the rack bar 10, and lift the latter from the escapement pinion 11, whenever a key 14 is depressed. As so far described in detail, the parts are in common use on said Underwood typewriting machine.

The cross computing mechanism or totalizer 80 includes a drive shaft 28, having a bevel pinion 29 meshing with a pinion 30 upon a square shaft 31, the latter being splined to a master-wheel 32, which moves along the shaft and has spurs or teeth 33 to engage an internal set of teeth 34 formed upon a gang of computing wheels 35, the latter mounted in a casing 36 and also having exterior teeth 37 to mesh with gears 38, the latter having number wheels 39. The master-wheel 32 is swiveled in a traveling hollow mandrel or arbor 40, within which the master-wheel shaft 31 may project, the swivel-joint being shown at 41, and permitting the master-wheel 32 to be rotated by the shaft 31, while said master wheel is caused to travel in axial direction by the mandrel or arbor 40.

The mechanism so far described in detail forms no part of the present invention, and the drive shaft 28 may be driven and controlled either directly by the numeral keys 1 or in any other suitable manner, as for instance in the manner set forth in my pending application No. 569,502, filed June 29, 1910. Since the driving means for said shaft form no part of the present invention, it is deemed unnecessary to illustrate the same. The shaft, it will be understood, is rotated automatically upon the depression of any of the numeral keys 1, the extent of rotation depending upon which key is depressed.

The mandrel 40 is moved endwise by means of a forwardly and rearwardly extending lever 42, pivoted midway of its ends by means of gudgeons 43, so as to swing in a horizontal plane. At its forward end the lever is slotted at 44 to engage a pin 45 projecting from the carriage which carries the mandrel 40; said carriage comprising a tube 46 sliding upon a fixed rod 47, and also an arm 48, sliding upon a fixed horizontal rod 49; the mandrel 40 being secured to the forward end of the arm 48 by means of a setscrew 50. The movement of the mandrel 40 is of course only sufficient to enable the master wheel 32 to travel the length of the gang of computing wheels 35, one of which is provided for each number wheel 39. The rod 47 coöperates with two similar rods or studs 47ᵃ and 47ᵇ, all projecting from a framework plate or bracket 47ᶜ, to carry a small plate 47ᵈ, which also supports the end of rod 49. It will be seen that 47ᵃ and 47ᵇ, Fig. 1, carry the casing 36.

At its rear end, the lever 42 has a slot 51 to engage a pin 52 projecting down from a slide 53, the latter carrying the stem 54 of a hook 55, adapted to engage lugs 56 formed upon said stops 18 or upon tappets or blades 57 which are forked to fit into the double rack 19, 20, for connecting the paper carriage 6 to the master wheel 32 to cause the latter to travel step-by-step with the paper carriage.

The slide 53 works in a tubular guide or housing 58, which is slotted on its under side at 59 to permit the pin 52 to pass down to the lever 42. The stem 54 of the hook passes through a longitudinal perforation in the slide 53, and is adjustably secured to the latter by set screws 60, Fig. 2. This permits slight longitudinal adjustment of the hook in order to enable the master wheel 32 to be adjusted properly relatively to the computing wheels 35 while the hook is engaged by one of the lugs 56. The rack 21 has at 60ᵃ the usual provision for longitudinal adjustment. The slide 53 has a feather 61, to fit into the slot 59, to prevent the slide and the hook from turning in the tube.

The hook has a notch 62 to enable it to engage any of the lugs 56. The hook normally springs up to engage the adjacent lug. For this purpose the hook may be made resilient or flexible, and a compression spring 63 may be employed to aid or cause the upward movement of the hook; said spring housed in a boss 64, and confined by a screw 65, and pressing a plunger 66 up against a straight portion of the under side of the hook, thus holding the latter up while permitting it to move freely endwise. The boss 64 is formed on a bushing 67, which is vertically slotted at 68 to form a guide for the hook; said bushing serving as a plug to close this end of the tubular housing 58.

When this hook is in engagement with one of said lugs 56, it is carried with the paper carriage 6 in the direction of the arrow at Fig. 2, that is, to the right to cause the lever 42 to swing upon its pivot and thereby drive the mandrel 40 and the master wheel 32 to the left at Fig. 4. As the keys 1 are operated to write figures in the column, the master wheel 32 is correspondingly rotated in any usual or suitable manner, to rotate the corresponding computing wheels 35. When the master wheel has advanced past the computing wheel 35 of lowest denomination. a cam 69 formed on the hook 55 engages a projection 70 fixed upon the framework of the machine, and is thereby forced downwardly, to withdraw the hook 55 from that lug 56 with which it has been in engagement. As soon as the hook is released, a returning spring 71 connected to the lever 42 swings the latter in the opposite direction, carrying the master wheel 32 backwardly or to the right at Fig. 4, that is, toward the computing wheel 35 of highest denomination; this movement continuing until the hook 55 engages the succeeding lug 56, said hook being pressed up to engage said lug by means of the spring 63, and the hook becoming fully seated in the notch 62, as at Fig. 5. The writing of the numbers in the succeeding column will now proceed, and said number will be accumulated on said computing wheels by the number wheels 39, in the manner already referred to.

When returning the carriage 6 to begin a new line of writing, if the hook 55 is in engagement with one of the lugs 56, it is carried to the left at Fig. 2, until a cam edge 72 thereon strikes a stud or roller 73, which may be pivoted upon a screw 74, threaded into the top of the boss 64; and by means of said roller or obstruction, the hook is cammed downwardly and released from the lug 56. The spring 63 immediately lifts the hook again, and the lugs 56 in succession ride freely over a bevel or point 75 formed on the tip of the hook; the last lug in the series being caught and held by the hook when the carriage begins to run in letter-feeding direction.

If, during the return of the carriage, any lug 56 strikes the hook 55 while clear of the stud 73, said lug will depress the hook 55 by the bevel 75, and jump the notch 62 of the hook before the spring 63 can make the lug engage the notch. This is possible because the bevel 75 on its side of the notch 62 is considerably higher than is the cam edge 72 on the other side of the notch, and the higher bevel throws the hook down a considerable distance. This jumping over the notch 62 is almost positive because the lug 56 fits the notch 62 closely, to avoid any lost motion, and this close fitting requires that the notch and lug be exactly alined before they can engage.

The column adder or upper computing mechanism 81, which may also be designated as a sub-totalizer, in that it obtains the sub totals of each column, includes a drive shaft 82 having a bevel pinion 83 meshing with a pinion 84 on a shaft 85, the latter being secured to a master wheel 86, which has spurs or teeth 87 to engage an internal set of teeth 88 formed upon a series or gang of computing wheels 89, the latter mounted in a casing 90, and having exterior teeth 91 to mesh with gears 92 carrying number wheels 93.

The relative movement of the master wheel and the computing wheels is obtained in this instance by connecting the casing carrying the computing wheels, to the carriage, which may be done in any suitable manner, as by means of a latch 94, so that the casing and computing wheels move with the carriage relative to the master wheel. The movable portion of the column adder or computing mechanism can be supported for this movement by means of rolls or wheels 95 engaging a supporting rail 95$^a$.

Since the driving means for said shaft 82 forms no part of this invention, it is deemed unnecessary to illustrate the same. The shaft, it will be understood, is rotated automatically upon the depression of any of the numeral keys 1, the extent of rotation depending upon which key is depressed.

As has been stated above, when the carriage is returned, the lever 42 is swung back its fullest extent by the spring 71, so that the arbor 40 will move the master wheel to a position corresponding to the initial computing wheel in the cross computing or totalizing mechanism.

It is desirable to have the master wheel occupy intermediate positions in order to utilize the full length of the typewriting line. It is therefore necessary to actuate the master wheel so that it can be caught at a position intermediate its extreme limits of movement. In this case, the return motion of the carriage is utilized to give a passive or ineffective movement of the master wheel 32. While the connection might be direct from the carriage to the totalizer 80, it has been found convenient because of its position, to make the connection from the sub-totalizer or column adder 81 to the totalizer 80. This connection is preferably such that it will be ineffective during the step-by-step movement of the carriage in a letter-feeding direction, and will be effective to the desired extent on the return movement of the carriage.

As illustrating one form of such connection embodying the invention, there is shown as being secured to the column adder 81, a connector 96, which is shown in the form of a bracket 97 secured to rails or bars 98 on the column adder 81, and provided with a trip 99 pivotally connected to the bracket 97 so as to move relative thereto in any suitable manner, as by being provided with a stud 100 journaled in a bearing provided in a flange 101 on the bracket 97. The trip 99 is preferably composite, so as to allow for relative movements in two directions. For this purpose it is shown as embodying a block 102, to which the stud shaft 100 is secured, and a latch 103 pivotally mounted on the block 102, as by being provided with an opening 104, whereby it can be journaled on a stud shaft 105.

The trip 99 is normally held in the position shown in Figs. 8, 9 and 12, by means of a spring 106, which is adapted to permit a yielding movement in one direction, movement in the opposite direction being limited by a stop 107 provided on the trip 99, which engages the under side of the bracket 97. The latch 103 is normally held in the position shown in Figs. 8, 9 and 12, by means of a spring 108, which, however, permits it to move to the position shown in Fig. 10. The action of the spring 108, in returning the latch 103 from the position shown in Fig. 10 to the position shown in Fig. 9, is limited by a shoulder 109 on the latch 103 engaging the flange 101.

While the connector 96 might engage any suitable movable portion of the cross computing mechanism or totalizer 80, it is preferable to provide a ward 110 secured to the sleeve or arbor 40, which carries the master wheel 32 so that the motion of the carriage, through the intermediary of the column adder 81, and the connector 96, may be manipulated on the return motion of the carriage.

It will be seen in Fig. 8, that the latch 103 of the connector, is in a position ready to manipulate the ward 110 or arbor shaft 40 and the master wheel 32, on an ineffective or passive stroke of said master wheel, for the purpose of obtaining a supplementary reset of the master wheel at the beginning of the writing line.

When the master wheel has been manipulated to a position such that it corresponds to the computing wheels in the units column, the latch 103 will be engaged by a tripper 111, which is shown in the form of a cam, adapted to disengage the latch 103 from the ward 110, by pivoting the same against the tension of the spring 108. This permits the lever 42 to be swung by the spring 71, so that it will tend to return the master wheel to a position corresponding to the maximum denomination wheel in the cross computing mechanism or totalizer, If, however, the initial tabular stop 57 is located at a point corresponding to any of the other denominations of the totalizer, the hook 55 will catch on said stop, so as to prevent further movement of the lever 42 and the master wheel 32, whereby said master wheel will be positioned in the denomination column desired, so that an accurate computation can be obtained while using the extreme left margin of the typewriting line.

On the step-by-step letter-feeding movement of the carriage, the latch 103, being located to the right of the ward 110, will be permitted to snap over said ward, as indicated in Fig. 13, by the trip pivoting on the stud shaft 100 against the tension of the spring 106, which returns it to its normal position, after it has passed the ward 110.

It will be seen that there is provided a connection between the carriage and the totalizer which moves the movable portion of the cross computing mechanism or totalizer step-by-step with the letter-feeding movement of the carriage, so as to cross add and totalize the numerals added in columns by the main adder or computing mechanism. This connection, as has been shown above, automatically resets the cross computing mechanism or totalizer before each new column or number, by the spring 71 returning the lever 42 until the hook carried thereby, engages the next tabular stop.

Inasmuch as, however, on the return movement of the carriage after completing a line, the hook, in disengaging from the final stop, permits the lever 42 to return the full distance under the influence of the spring 71, so that the master wheel 32 will be in the initial column, it is necessary to reset the movable portion of the cross adder or totalizer, which in this instance is the master wheel, to the desired point, that is to say, to enable the connection between the carriage and the totalizer to regain accurate control of the movement of the master wheel thereby. This is accomplished by utilizing the return movement of the carriage to manipulate the master wheel a full ineffective or passive stroke, so that the spring 71 can once more act to return the lever 42, enabling the hook 55 to be caught by a properly located tabular stop, which operation is attained through the intermediary of the connector 96, which transmits the movement of the carriage to the movable portion of the cross adder or totalizer.

When the connector has moved the master wheel the full length of its travel, the tripper 111 disengages the latch 103 of the trip and the connector from engagement with the ward 110, permitting the spring 71 to tend to return the master wheel the full length of its stroke in resetting the same, which movement, however, is limited by the catching of the hook 55 by the tabular stop set at a point corresponding to the maximum denomination column of the number which it is desired to compute, at the beginning of the typewriting line, or in the first column of numbers.

It will be seen that on the step-by-step movement of the carriage, the ward 110 will be permitted to pass the connector 96 without the movement of the one influencing the other, by reason of the fact that the tripper can pivot about the shaft 100, against the tension of the spring 106, which will return the tripper to its normal position.

Variations may be resorted to within the scope of the invention, and portions of the improvements may be used without others.

Having thus described by invention, I claim:

1. The combination with a typewriter carriage, of a long primary totalizer, a supplementary short totalizer, said primary totalizer having an element traveling with said carriage to determine the individual activity of the computing wheels thereof to correspond to the active printing point of said carriage, said supplementary totalizer also having a traveling element to determine the individual activity of the computing wheels thereof, and means controlled directly from said carriage for determining which of the computing wheels of said supplementary totalizer will be concomitantly active with the various wheels of said primary totalizer.

2. The combination with a carriage, of a computing mechanism comprising a totalizer movable with said carriage, a second computing mechanism comprising a totalizer, connections between said carriage and said second computing mechanism for moving certain parts of said second computing mechanism from said carriage, and connections between said computing mechanisms, whereby the totalizer of one of said computing mechanisms may move other parts of the other of said computing mechanisms.

3. The combination with a carriage, of a computing mechanism comprising a totalizer movable with said carriage, a second computing mechanism comprising a totalizer, connections between said carriage and said second computing mechanism for moving certain parts of said second computing mechanism from said carriage, and connections between said computing mechanisms, whereby said carriage may operate certain parts of said second computing mechanism, through the intermediary of the totalizer of said first-mentioned computing mechanism.

4. The combination with a carriage, of a computing mechanism, connections between said carriage and said computing mechanism comprising a lever pivoted between its ends, whereby said carriage may manipulate said computing mechanism during letter-spacing movement of said carriage, and disconnected therefrom during the return movement, and connections independent of said lever between said carriage and said computing mechanism, whereby said carriage may manipulate said computing mechanism during its return movement, the manipulation of said computing mechanism through said second-mentioned connections, acting to cause said lever to recover accurate control of said computing mechanism after the termination of one major letter-feeding movement and at the beginning of a second major letter-feeding movement.

5. The combination with a carriage, of a computing mechanism for cross computing a plurality of numbers in a line, connections including a lever pivoted between its ends between said carriage and said cross computing mechanism for manipulating certain portions of said computing mechanism step-by-step during the letter-feeding movement of said carriage, said connections including means for resetting said computing mechanism for each number, said lever losing control of said cross computing mechanism during the return movement of said carriage, and means operating to recover for said lever accurate control of said computing mechanism for the initial number in each line.

6. The combination with a carriage, of a computing mechanism for cross computing a plurality of numbers in a line, connections including a lever pivoted between its ends between said carriage and said cross computing mechanism for manipulating certain portions of said computing mechanism step-by-step during the letter-feeding movement of said carriage, said connections including means for resetting said computing mechanism for each number, said lever losing control of said cross computing mechanism during the return movement of said carriage, and means actuated by the return movement of said carriage, operating to recover for said lever, accurate control of said computing mechanism for the initial number in each line.

7. The combination with a carriage, of a computing mechanism for cross computing numbers arranged according to a typewriting line, a lever for manipulating certain portions of said computing mechanism step-by-step during the letter feeding movement of said carriage, stops carried by said carriage for determining the movement of said lever, a hook connected to said lever and adapted to be engaged by said stops whereby said hook and said lever are manipulated from said carriage to actuate certain portions of said computing mechanism, means for resetting said computing mechanism after actuation by each of said stops, and means operated by the return movement of said carriage for giving an ineffective or passive movement to said lever after said hook has left the final stop connected to said carriage, and before it has engaged with the initial stop connected with said carriage.

8. The combination with a carriage, of a computing mechanism for cross computing numbers arranged according to a typewriting line, a lever for manipulating certain portions of said computing mechanism step-by-step during the letter-feeding movement of said carriage, stops carried by said carriage for determining the movement of said lever, a hook connected to said lever and adapted to be engaged by said stops whereby said hook and said lever are manipulated from said carriage to actuate certain portions of said computing mechanism, means for resetting said computing mechanism after actuation by each of said stops, means operated by the return movement of said carriage for giving an ineffective or passive movement to said lever after said hook has left the final stop connected to said carriage, and before it has engaged with the initial stop connected with said carriage, and means for disengaging said hook from each of said stops, after said carriage, in its step-by-step letter-feeding movement, has actuated said computing mechanism to the desired extent.

9. The combination with a carriage, of a computing mechanism for cross computing numbers arranged according to a typewriting line, a lever for manipulating certain portions of said computing mechanism step-by-step during the letter-feeding movement of said carriage, stops carried by said carriage for determining the movement of said lever, a hook connected to said lever and adapted to be engaged by said stops whereby said hook and said lever are manipulated from said carriage to actuate certain portions of said computing mechanism, means for resetting said computing mechanism after actuation by each of said stops, and means operated by the return movement of said carriage for giving an ineffective or passive movement to said lever after said hook has left the final stop connected to said carriage, and before it has engaged with the initial stop connected with said carriage, said last-mentioned means comprising a connection between said carriage and said computing mechanism, operative during the return movement of said carriage, and inoperative during the step-by-step letter-feeding movement of said carriage.

10. The combination with a carriage, of a computing mechanism for cross computing numbers arranged according to a typewriting line, a lever for manipulating certain portions of said computing mechanism step-by-step during the letter feeding movement of said carriage, stops carried by said carriage for determining the movement of said lever, a hook connected to said lever and adapted to be engaged by said stops whereby said hook and said lever are manipulated from said carriage to actuate certain portions of said computing mechanism, means for resetting said computing mechanism after actuation by each of said stops, means operated by the return movement of said carriage for giving an ineffective or passive movement to said lever after said hook has left the final stop connected to said carriage, and before it has engaged with the initial stop connected with said carriage, said last-mentioned means comprising a trip movable with said carriage, and adapted to manipulate certain portions of said computing mechanism, and a tripper connected to disconnect said trip from said computing mechanism when said computing mechanism has been manipulated to the extent desired.

11. The combination with a carriage, of a computing mechanism for cross computing numbers arranged according to a typewriting line, a lever for manipulating certain portions of said computing mechanism step-by-step during the letter feeding movement of said carriage, stops carried by said carriage for determining the movement of said lever, a hook connected to said lever and adapted to be engaged by said stops whereby said hook and said lever are manipulated from said carriage to actuate certain portions of said computing mechanism, means for resetting said computing mechanism after actuation by each of said stops, means operated by the return movement of said carriage for giving an ineffective or passive movement to said lever after said hook has left the final stop connected to said carriage, and before it has engaged with the initial stop connected with said carriage, said last-mentioned means comprising a trip connecting said carriage with said computing mechanism, said trip embodying a pivotally mounted block, permitting said trip to swing in one direction, and a latch pivotally mounted on said block adapted to swing in another direction, whereby said trip will manipulate certain portions of said computing mechanism when moving in one direction, and will inoperatively slip over said computing mechanism when moving in the opposite direction, and a tripper for disengaging said latch from said computing mechanism, when said trip is moving in said first-mentioned direction, after said computing mechanism has been manipulated to the extent desired.

12. The combination with a carriage, of a computing mechanism for cross computing numbers arranged according to a typewriting line, a lever connected to said computing mechanism for manipulating certain portions of said computing mechanism to correspond to the step-by-step letter-feeding movement of said carriage, a plurality of adjustable tabular stops carried by said carriage, a hook carried by said lever adapted to engage said tabular stops, whereby the movement of said carriage may be transmitted to said lever and then to certain portions of said computing mechanism, means for disengaging said hook from each of said tabular stops at the end of the stroke of said lever caused by the movement of said carriage during the period of connection of each tabular stop with said hook, means for retrieving said lever after actuation by each stop, means for disconnecting said hook from the final stop carried by said carriage, and means for imparting to said lever and portions of the computing mechanism connected therewith, a false computing stroke, so that said retrieving means may return said hook to enable it to properly engage with the initial stop carried by said carriage, so as to properly position the movable portion of said computing mechanism to correspond with the position of said initial stop.

13. The combination with a carriage, of a computing mechanism for cross computing numbers arranged according to a typewriting line, a lever connected to said computing mechanism for manipulating certain portions of said computing mechanism to correspond to the step-by-step letter-feeding movement of said carriage, a plurality of adjustable tabular stops carried by said carriage, a hook carried by said lever adapted to engage said tabular stops, whereby the movement of said carriage may be transmitted to said lever and then to certain portions of said computing mechanism, means for disengaging said hook from each of said tabular stops at the end of the stroke of said lever caused by the movement of said carriage during the period of connection of each tabular stop with said hook, means for retrieving said lever after actuation by each stop, means for disconnecting said hook from the final stop carried by said carriage, and means for imparting to said lever and portions of the computing mechanism connected therewith, a false computing stroke, so that said retrieving means may return said hook to enable it to properly engage with the initial stop carried by said carriage, so as to properly position the movable portion of said computing mechanism to correspond with the position of said initial stop, said last-mentioned means including a connector for connecting said carriage to certain portions of said computing mechanism, said connector being arranged to slip automatically by said computing mechanism inoperatively during the step-by-step movement of said carriage.

14. The combination with a carriage, of a computing mechanism for cross computing numbers arranged according to a typewriting line, a lever connected to said computing mechanism for manipulating certain portions of said computing mechanism to correspond to the step-by-step letter-feeding movement of said carriage, a plurality of adjustable tabular stops carried by said carriage, a hook carried by said lever adapted to engage said tabular stops, whereby the movement of said carriage may be transmitted to said lever and then to certain portions of said computing mechanism, means for disengaging said hook from each of said tabular stops at the end of the stroke of said lever caused by the movement of said carriage during the period of connection of each tabular stop with said hook, means for retrieving said lever after actuation by each stop, means for disconnecting said hook from the final stop carried by said carriage, means for imparting to said lever and portions of the computing mechanism connected therewith, a false computing stroke, so that said retrieving means may return said hook to enable it to properly engage with the initial stop carried by said carriage, so as to properly position the movable portion of said computing mechanism to correspond with the position of said initial stop, said last-mentioned means including a connector for connecting said carriage to certain portions of said computing mechanism, said connector being arranged to slip automatically by said computing mechanism inoperatively during the step-by-step movement of said carriage, and a tripper for disconnecting said connector from said computing mechanism, after having been operatively connected thereto.

15. The combination with a carriage, of a computing mechanism for cross computing numbers arranged according to a typewriting line, connections including a lever pivoted between its ends between said carriage and said computing mechanism, for manipulating certain portions of said computing mechanism step-by-step during the letter-feeding movement of said carriage, said connections including means for resetting said computing mechanism for each number, and a connector for manipulating said computing mechanism from said carriage, during the return motion of the latter, so as to impart a false computing stroke to said computing mechanism while disconnected from said lever, whereby said resetting mechanism may have an extra operation between the last number in one line, and the initial number in the next line.

16. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, and a connector for manipulating said computing mechanism from said carriage, during the return motion of the latter, so as to impart a false computing stroke to said computing mechanism, whereby said resetting mechanism may have an extra operation between the last number in the line, and the initial number in the next line, said connector being arranged to slip by said computing mechanism inoperatively during the letter-feeding movement of said carriage.

17. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, a connector for manipulating said computing mechanism from said carriage, during the return motion of the latter, so as to impart a false computing stroke to said computing mechanism, whereby said resetting mechanism may have an extra operation between the last number in one line, and the initial number in the next line, and a tripper for disengaging said connector from said computing mechanism, at the end of the stroke of the portion of the computing mechanism actuated by said connector.

18. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, a trip for connecting said carriage with said computing mechanism, so that said carriage can actuate said computing mechanism, and a tripper for disengaging said trip from said computing mechanism.

19. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, a trip for connecting said carriage with said computing mechanism, whereby said carriage can manipulate certain portions of said computing mechanism, and a ward engaging said trip, said trip being constructed so as to automatically slip by said ward during the movement of said carriage in one direction, and to operatively engage said ward during the movement of said carriage in the opposite direction.

20. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, a trip for connecting said carriage with said computing mechanism, whereby said carriage can manipulate certain portions of said computing mechanism, a ward engaging said trip, said trip being constructed so as to automatically slip by said ward during the movement of said carriage in one direction, and to operatively engage said ward during the movement of said carriage in the opposite direction, and a tripper for disengaging said trip from said ward at the end of the desired extent of movement of said computing mechanism by said carriage, through the intermediary of said trip.

21. The combination with a carriage, of a computing mechanism for cross computing numbers arranged according to a typewriting line, connections between said carriage and said computing mechanism for manipulating certain portions of said computing mechanism step-by-step during the letter-feeding movement of said carriage, said connections including means for resetting said computing mechanism for each number, a pivotally mounted trip movable with said carriage, a ward located so as to be engaged by said trip to transmit the movement of said carriage to certain portions of said computing mechanism, and a spring connected to said trip for permitting said trip to snap over said ward and for returning said trip to its normal position.

22. The combination with a carriage, of a computing mechanism for cross computing numbers arranged according to a typewriting line, connections between said carriage and said computing mechanism for manipulating certain portions of said computing mechanism step-by-step during the letter-feeding movement of said carriage, said connections including means for resetting said computing mechanism for each number, a trip for forming a connection between said carriage and said computing mechanism, whereby certain portions of said computing mechanism may be manipulated from said carriage, said trip embodying a block, a catch pivotally mounted on said block, a spring for holding said catch in a normal position, and a tripper for manipulating said catch relative to said block, so as to permit the disconnection of said carriage from said computing mechanism through the intermediary of said trip.

23. The combination with a carriage, of a computing mechanism for cross computing numbers arranged according to a typewriting line, connections between said carriage and said computing mechanism, for manipulating certain portions of said computing mechanism step-by-step during the letter-feeding movement of said carriage, said connections including means for resetting said computing mechanism for each number, a tripper pivotally mounted so as to move with said carriage, a spring for holding said tripper in a normal position, a ward connected to said computing mechanism, and extending in the path of said tripper, said tripper being adapted to operatively connect certain portions of said computing mechanism to said carriage through the intermediary of said ward when said carriage is moving in one direction, and being adapted to slip over said ward when said carriage is moving in the opposite direction, said trip embodying a block, a latch pivotally mounted on said block, a spring for holding said latch in a normal position, and a tripper mounted to disengage said latch from said ward.

24. The combination with a carriage, of a computing mechanism operatively connected to said carriage, a totalizer, connections including a lever pivoted between its ends between said totalizer and said carriage, whereby said totalizer may be moved step-by-step with said carriage to compute the numerals computed by said computing mechanism, said connections including means independent of said lever for resetting said totalizer for each number computed by said computing mechanism, and connections between said computing mechanism and said totalizer, for accurately governing the relative positions of said computing mechanism and said totalizer at the beginning of each line.

25. The combination with a carriage, of a computing mechanism operatively connected to said carriage, a totalizer, connections including a lever pivoted between its ends between said totalizer and said carriage, whereby said totalizer may be moved step-by-step with said carriage to compute the numerals computed by said computing mechanism, said connections including means for resetting said totalizer for each number computed by said computing mechanism, and a connector independent of said lever for manipulating certain portions of said totalizer so as to govern the relative positions of said totalizer and said computing mechanism, said connector operative to manipulate said totalizer in one direction, and inoperative to manipulate said totalizer in the opposite direction.

26. The combination with a computing mechanism capable of computing a plurality of columns of numbers, of a totalizer capable of computing all of the numbers in all of the columns to obtain a grand total, a lever pivoted between its ends forming part of a connection between said mechanism and said totalizer and means independent of said lever for readjusting the relation between said totalizer and said computing mechanism before computing each number in the initial column.

27. The combination with a carriage, of a computing mechanism capable of manipulation by said carriage, a second computing mechanism capable of manipulation by said carriage, and connections between said computing mechanisms, whereby the one can be manipulated from the other, said connections including a trip operable to connect said computing mechanisms, when said computing mechanisms have a relative movement toward each other, and inoperative to connect said computing mechanisms when said computing mechanisms have a relative movement away from each other.

28. The combination with a carriage, of a computing mechanism capable of manipulation by said carriage, a second computing mechanism capable of manipulation by said carriage, and connections between said computing mechanisms, whereby the one can be manipulated from the other, said connections including a trip operable to connect said computing mechanisms, when said computing mechanisms have a relative movement toward each other, and inoperative to connect said computing mechanisms when said computing mechanisms have a relative movement away from each other, and a tripper for disrupting the connection between said computing mechanisms, after said computing mechanisms have been connected through the intermediary of said trip.

29. The combination with a carriage, of a computing mechanism including computing wheels and a master wheel capable of causing the movement of every one of said computing wheels, a second set of computing wheels, a master wheel capable of being effective on any of said second set of wheels, and automatic selecting means for determining the initial relative position of said master wheels and said respective sets of computing wheels to any predetermined relation before the computation of a number, so as to determine which of said computing wheels shall be first actuated through the intermediary of its master wheel, said means comprising a lever pivoted between its ends, and means independent of the lever for controlling the selecting means when beyond control of the lever.

30. The combination with a typewriter carriage, of a long primary totalizer, a supplementary short totalizer, said primary totalizer having an element traveling with said carriage to determine the individual activity of the computing wheels thereof to correspond to the active printing point of said carriage, said supplementary totalizer also having a traveling element to determine the individual activity of the computing wheels thereof, a lever pivoted between its ends extending from said carriage for determining which of the computing wheels of said supplementary totalizer will be concomitantly active with the various wheels of said primary totalizer, denomination selecting means caused to travel by said lever, and means for actuating said last-mentioned means from said primary totalizer.

31. The combination with a typewriter carriage, of a long primary totalizer, a supplementary short totalizer, said primary totalizer having an element traveling with said carriage to determine the individual activity of the computing wheels thereof to correspond to the active printing point of said carriage, said supplementary totalizer also having a traveling element to determine the individual activity of the computing wheels thereof, and a lever controlled directly from said carriage for determining which of the computing wheels of said supplementary totalizer will be concomitantly active with the various wheels of said primary totalizer, settable stops for making said lever selectively variable in its action, and means for putting said lever under the control of said carriage by moving it from said carriage, in an opposite direction when free of a predetermined stop.

32. The combination with a typewriter carriage, of a long primary totalizer, a short supplementary totalizer to be brought in register with several sections of said primary totalizer, said primary totalizer having an element traveling directly with said carriage to determine the individual activity of the computing wheels thereof to correspond with the active printing point of said carriage, said supplementary totalizer also having a traveling element to determine the individual activity of the computing wheels thereof, a lever pivoted between its ends for so moving the supplementary totalizer element, said totalizers being normally independent of each other, and carriage controlled means separate from said lever for moving the traveling element of said supplementary totalizer in unison with that of said primary totalizer while said supplementary totalizer remains directly disconnected from said primary totalizer.

33. The combination with a typewriter carriage, of a long primary totalizer, a short supplementary totalizer to be brought in register with several sections of said primary totalizer, said primary totalizer having an element traveling directly with said carriage to determine the individual activity of the computing wheels thereof to correspond with the active printing point of said carriage, said supplementary totalizer also having a traveling element to determine the individual activity of the computing wheels thereof, said totalizers being normally independent of each other, a carriage controlled lever pivoted between its ends for moving the traveling element of said supplementary totalizer in unison with that of said primary totalizer while said supplementary totalizer remains directly disconnected from said primary totalizer, and means for momentarily connecting said primary and said supplementary totalizers together between the writing of two lines so as to give an extra action of said last-mentioned means whereby the computing wheel of said supplementary totalizer first in action at the beginning of a line, may be determined according to a predetermined selection.

34. The combination with a long totalizer, of a supplementary short totalizer, means comprising a lever pivoted between its ends and a series of settable stops for repeatedly bringing said short totalizer in register with several sections of said long totalizer, and additional means to enable said lever to bring any computing wheel of said supplementary totalizer in register with the initial wheel of said long totalizer.

35. The combination with a primary totalizer, of a secondary totalizer, each of said totalizers having computing wheels, and means including a lever pivoted between its ends connecting said totalizers and supplementary connecting means effective at one end of the travel of one totalizer for bringing any one of the computing wheels of said secondary totalizer into active register with the initial wheel of said primary totalizer so that the same number can be run up on both.

36. In a computing machine, the combination with a traveling carriage, of a catch thereon, a second carriage adapted to be caught by said catch, a pivoted latch forming part of said catch and revoluble in one direction, a body on which said latch is pivoted, said body pivoted to revolve in one direction only, a cam to turn said latch on its pivot to release said second carriage, and means for causing the carriages to travel together after being thus released, so that they will come into proper register with each other.

37. In a computing machine, the combination with a traveling carriage, of a catch thereon, a second carriage adapted to be caught by said catch, a pivoted latch forming part of said catch and revoluble in one direction, a body on which said latch is pivoted, said body pivoted to revolve in one direction only, a cam to turn said latch on its pivot, to release said second carriage, said second carriage comprising an abutment, an extension of said latch lying in the path of said abutment, a spring holding said latch in said path but yielding on the return movement of said carriage to permit said body to be turned by said abutment to swing said latch idly out of its path, and means for causing the carriages to travel together after being thus released so that they will come into proper register with each other.

38. In a computing machine, the combination with a traveling carriage and a footing totalizer connected thereto, of a cross totalizer, a carriage for selecting denominations in said cross totalizer intermittently connected to the first totalizer, and a latch for additionally moving said cross totalizer carriage.

39. In a computing machine, the combination with a traveling carriage, of a computing carriage intermittently connected thereto to be moved thereby, a spring for causing said computing carriage to normally assume a given position when not connected to said traveling carriage, and a catch for momentarily neutralizing the action of said spring to enable said computing carriage to be connected at a point beyond the range of said intermittent connection.

40. The combination with a traveling typewriter carriage, of a long totalizer for footing groups of numbers written on said carriage, a short totalizer to work therewith, said long totalizer comprising a continuous train of computing wheels which travel with the typewriter carriage, said short totalizer comprising a traveling denomination-selector and comprising computing wheels which revolve in fixed planes, a lever pivoted between its ends for connecting through said typewriter carriage the denomination-selector of the short totalizer to said long totalizer, devices for intermittently picking up and releasing said lever, and a latch adapted to momentarily carry said denomination-selector when said typewriter carriage approaches the beginning of a written line, said latch being adapted to put said selector under the control of said lever and then release it.

41. In a computing machine, the combination with a traveling carriage, of a computing carriage intermittently connected thereto to be moved thereby, a lever pivoted intermediate its ends for so connecting said carriage, a spring for causing said computing carriage to normally be drawn to one end of its travel when not connected to said traveling carriage, and a catch for connecting said carriages at one point in their respective travels to cause said carriages to be connected at a point at which they would normally not be connected by said lever.

42. In a computing machine, the combination with a traveling carriage, of a computing carriage intermittently connected thereto to be moved thereby, a lever pivoted intermediate its ends for so connecting said carriage, a spring for causing said computing carriage to normally be drawn to one end of its travel when not connected to said traveling carriage, a catch for causing said carriages to travel together to cause said lever to connect them at a point where it would not ordinarily connect them, a latch forming part of said catch, a pivot on which said latch swings, a spring for permitting said latch to be swung in one direction, and an abutment for preventing said latch from being swung in the opposite direction.

43. In a computing machine, the combination with a traveling carriage, of a computing carriage intermittently connected thereto to be moved thereby, a lever pivoted intermediate its ends for so connecting said carriages, a spring for causing said computing carriage to normally be drawn to one end of its travel when not connected to said traveling carriage, a catch for causing said carriages to travel together to cause said lever to connect them at a point where it would not ordinarily connect them, a latch forming part of said catch, a pivot on which said latch swings, a spring for permitting said latch to be swung in one direction, an abutment for preventing said latch from being swung in the opposite direction, and a cam for swinging said latch against the tension of said spring to disconnect said carriages when one carriage has reached the limit of its motion.

44. In a computing machine, the combination with a series of footing totalizers including an initial narrow one, of a single master wheel for said totalizers, a traveling carriage controlling the relation of said totalizers and said master wheel, a cross totalizer of greater width than said initial totalizer, a master wheel for said cross totalizer, a cross computing carriage for said cross totalizer, a pivoted latch for intermittently connecting said traveling carriage and computing carriage, a cam for automatically disconnecting them, and a latch for moving said carriages together to cause them to be connected at a point where they would not otherwise be connected.

45. In a combined typewriting and computing machine of the class specified, the combination with a primary totalizer, of a supplementary totalizer not of undue length, means connected with the carriage to actuate the wheels in the long totalizer successively without always actuating both totalizers in correspondence, means also connected to said carriage for actuating the wheels in the supplementary totalizer successively, and means also connected to the carriage for selecting the wheels of the supplementary totalizer to be active together with the wheels of the primary totalizer or register.

46. In a combined typewriting and computing machine, the combination with a traveling carriage, of a totalizer traveling therewith, a second totalizer comprising a denominational carriage intermittently connected to said traveling carriage, a device for so connecting it, operating means for said second totalizer, means normally tending to return said operating means to a predetermined position, and a latch comprising a member ineffective in one direction but adapted in the opposite direction to be effective, for momentarily connecting two computing totalizers together so as to determine which of the computing wheels of each will be brought in register with each other and cause said device to connect said carriages at a point at which said carriages would fail to be so intermittently connected.

47. The combination with a carriage and two totalizers acting in unison and separately, a device for connecting them to act in unison in a manner determined by said carriage, of an additional device comprising a latch for additionally momentarily connecting said totalizers to connect them in a new position by said latch, said latch revolving in one direction only, and a cam mechanism effective on said latch to control the necessary carriage connection and disconnection to permit the first device to have control.

WALTER WRIGHT.

Witnesses:
CHERYL A. MERRILL,
W. C. PINER.